United States Patent
Peng et al.

(10) Patent No.: US 8,059,427 B2
(45) Date of Patent: Nov. 15, 2011

(54) SLIDE MECHANISM FOR SLIDE-TYPE PORTABLE ELECTRONIC DEVICE

(75) Inventors: Zhi-Gang Peng, Shenzhen (CN);
Zhi-Qiang Shi, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 385 days.

(21) Appl. No.: 12/481,686

(22) Filed: Jun. 10, 2009

(65) Prior Publication Data

US 2010/0089192 A1 Apr. 15, 2010

(30) Foreign Application Priority Data

Oct. 14, 2008 (CN) .......................... 2008 1 0304918

(51) Int. Cl.
*H04B 1/03* (2006.01)
*H05K 5/02* (2006.01)

(52) U.S. Cl. .......................... 361/814; 361/756; 361/727

(58) Field of Classification Search .................. 361/600, 361/727, 728, 736, 737, 741, 756, 679.01–679.26, 361/679.31–679.33, 802, 814; 455/575.1–575.4, 455/566, 90.3
See application file for complete search history.

(56) References Cited

U.S. PATENT DOCUMENTS

| | | | |
|---|---|---|---|
| 6,822,871 B2 * | 11/2004 | Lee et al. | 361/727 |
| 7,599,723 B2 * | 10/2009 | Lee et al. | 455/575.4 |
| 7,663,889 B2 * | 2/2010 | Lajara et al. | 361/759 |
| 7,773,374 B2 * | 8/2010 | Dong et al. | 361/679.39 |
| 7,876,578 B2 * | 1/2011 | Chang | 361/816 |
| 7,953,464 B2 * | 5/2011 | Park et al. | 455/575.4 |
| 7,986,511 B2 * | 7/2011 | Dong et al. | 361/679.01 |
| 2007/0060220 A1 * | 3/2007 | Hsu | 455/575.4 |
| 2009/0035056 A1 * | 2/2009 | Kim et al. | 403/326 |
| 2011/0051332 A1 * | 3/2011 | Zhang | 361/679.01 |

* cited by examiner

*Primary Examiner* — Hung S Bui
(74) *Attorney, Agent, or Firm* — Altis Law Group, Inc.

(57) ABSTRACT

A slide mechanism used in portable electronic device is described including a main plate, a slide plate, and an elastic member. The elastic member includes a first mounting portion, a second mounting portion, a first curved portion and a second curved portion. Each of the first curved portion and the second curved portion connects the first mounting portion and the second mounting portion. The first mounting portion is secured to the main plate, and the second mounting portion is secured to the sliding plate. The sliding plate slides lengthwise over the main plate by the deformation or restoration of the elastic member.

17 Claims, 6 Drawing Sheets

SLIDE MECHANISM FOR SLIDE-TYPE PORTABLE ELECTRONIC DEVICE

BACKGROUND

1. Technical Field

The present disclosure generally relates to slide mechanisms and, particularly, to a slide-type portable electronic device with two or more housings using a sliding mechanism that allows one housing to slide over another housing in a longitudinal direction.

2. Description of Related Art

Slide-type portable electronic devices have been increasingly used among diverse designs for portable electronic devices. The slide-type portable electronic device has two housings, of which one slides over the other to open/close the portable electronic device.

A slide mechanism is generally used in the slide-type portable electronic device for driving the sliding between the two housings. However, the slide mechanism can be complex in structure and difficult to assemble within the portable electronic device. As a result of the structural complexity and assembling difficulty, production costs can be high.

Therefore, there is room for improvement within the art.

BRIEF DESCRIPTION OF THE DRAWINGS

Many aspects of the new slide mechanism for slide-type portable electronic device can be better understood with reference to the following drawings. The components in the drawings are not necessarily drawn to scale, the emphasis instead being placed upon clearly illustrating the principles of the new slide mechanism for slide-type portable electronic device. Moreover, in the drawings, like reference numerals designate corresponding parts throughout the several views.

DETAILED DESCRIPTION

Figure 1:
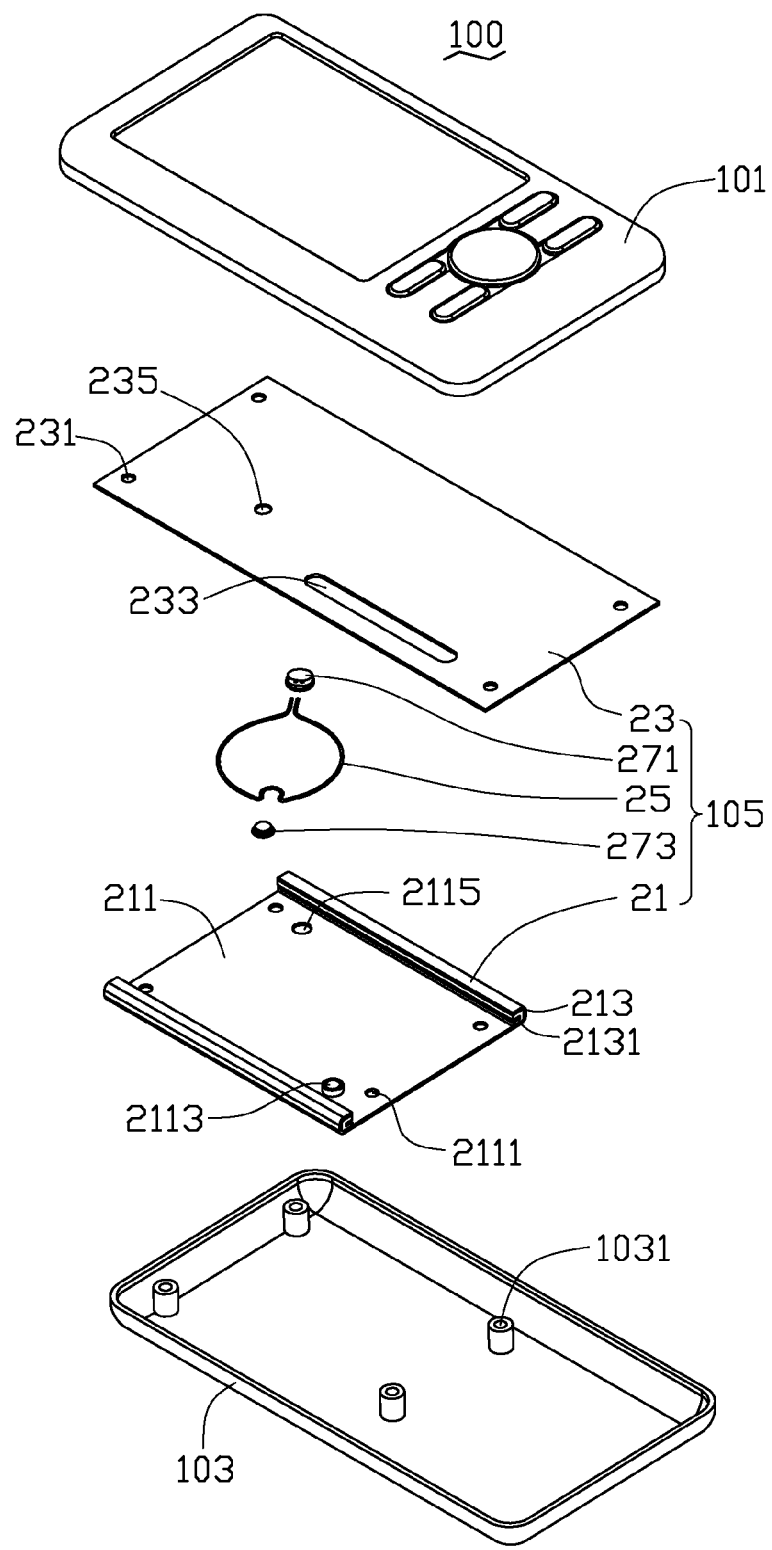
FIG. 1 is an isometric exploded view of a portable electronic device using a slide mechanism according to an exemplary embodiment, the sliding mechanism including an elastic member, a fixing column and a positioning column.

FIG. 1 shows an exemplary slide mechanism 105 used in a slide-type portable electronic device 100 such as a mobile phone, a personal digital assistant, etc. The portable electronic device 100 includes a first housing 101 and a second housing 103 engaging with the first housing 101. The slide mechanism 105 can be assembled between the first housing 101 and the second housing 103, and generate an elastic force sufficient to slide the first and second housings 101 and 103 relative to each other. The second housing 103 has four positioning pins 1031 arranged thereon.

The slide mechanism 105 includes a main plate 21, a sliding plate 23, an elastic member 25, a fixing column 271, and a positioning column 273. The elastic member 25 is assembled between the sliding plate 23 and the main plate 21. The elastic member 25 is secured to the main plate 21 by the fixing column 271, and secured to the sliding plate 23 by the positioning column 273.

The main plate 21 includes a main base portion 211 and two rail portions 213. The two rail portions 213 and the main base portion 211 define two opposite guiding grooves 2131 therebetween. The main base portion 211 defines four mounting holes 2111 at the four corners. When the main plate 21 is securely mounted to the second housing 103, the four positioning pins 1031 securely engage in the four mounting holes 2111, respectively. The main base portion 211 arranges a guiding column 2113 adjacent to one of the four mounting holes 2111. The main base portion 211 defines an assembling hole 2115 adjacent to another one of the four mounting holes 2111.

The sliding plate 23 can be slidably received in the guiding groove 2131. The sliding plate 23 defines four mounting holes 231, a guiding slot 233, and an accommodating hole 235. The four mounting holes 231 facilitate the fixing of the sliding plate 23 to the first housing 101. The guiding slot 233 is configured so that the guiding column 2113 can insert into and slide along the guiding slot 233. The sliding path of the sliding plate 23 can be limited by the engaging of the guiding column 2113 into the guiding slot 233.

Figure 2:
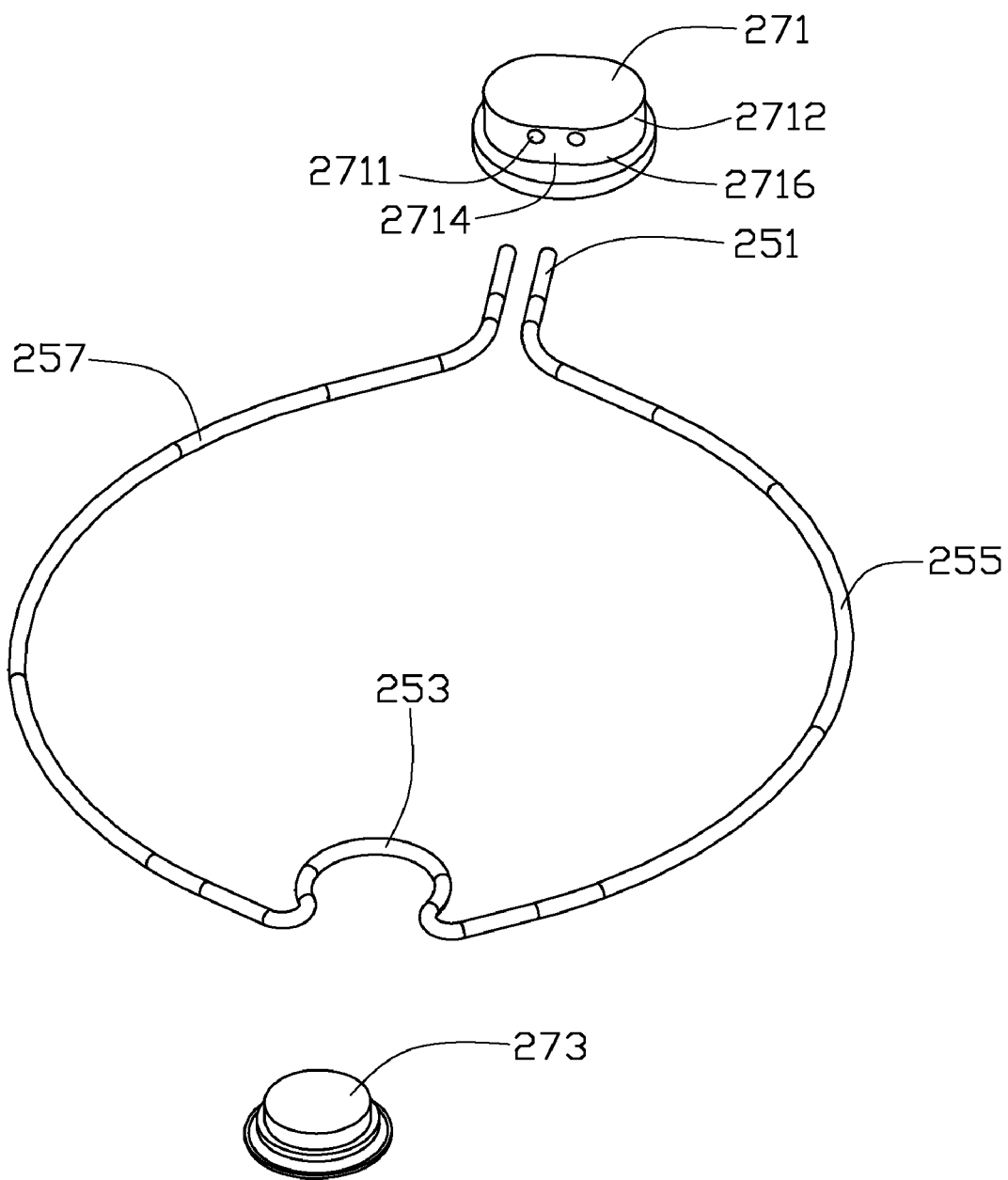
FIG. 2 is an enlarged view of the elastic member, the fixing column and the positioning column shown in FIG. 1.

Referring further to FIG. 2, the elastic member 25 can be a metallic ring including a first mounting portion 251, a second mounting portion 253, a first curved portion 255, and a second curved portion 257. Each of the first curved portion 255 and the second curved portion 257 connects the first mounting portion 251 to the second mounting portion 253. The first mounting portion 251 is two separated, distal end portions of the elastic member 25. The second mounting portion 253 is located at the middle of the elastic member 25 and recessed inwardly towards the center of the elastic member 25.

The fixing column 271 is step-shaped including a first end portion 2712 and a second end portion 2716. The first end portion 2712 is exposed through the assembling hole 2115 of the main plate 21 when the fixing column 271 is fixed to the main plate 21. The first end portion 2712 defines two locking holes 2711 for locking the first mounting portion 251 of the elastic member 25 therein. The positioning column 273 is step shaped and can rotatably extend through the accommodating hole 235 of the sliding plate 23. The second mounting portion 253 of the elastic member 25 can securely coil around the positioning column 273.

Figure 3:
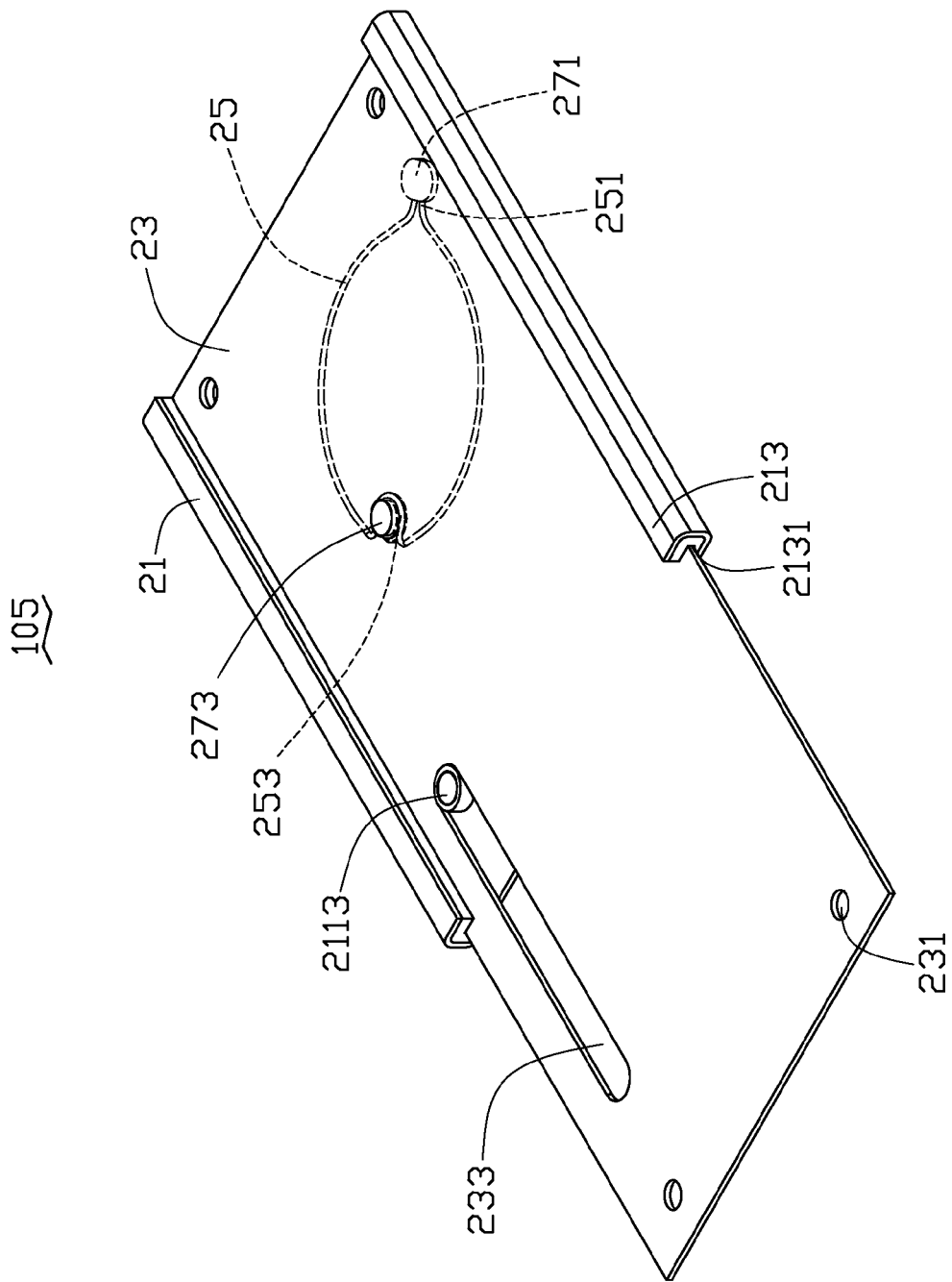
FIG. 3 is an assembled view of the sliding mechanism shown in FIG. 1, in a closed position.
Figure 4:
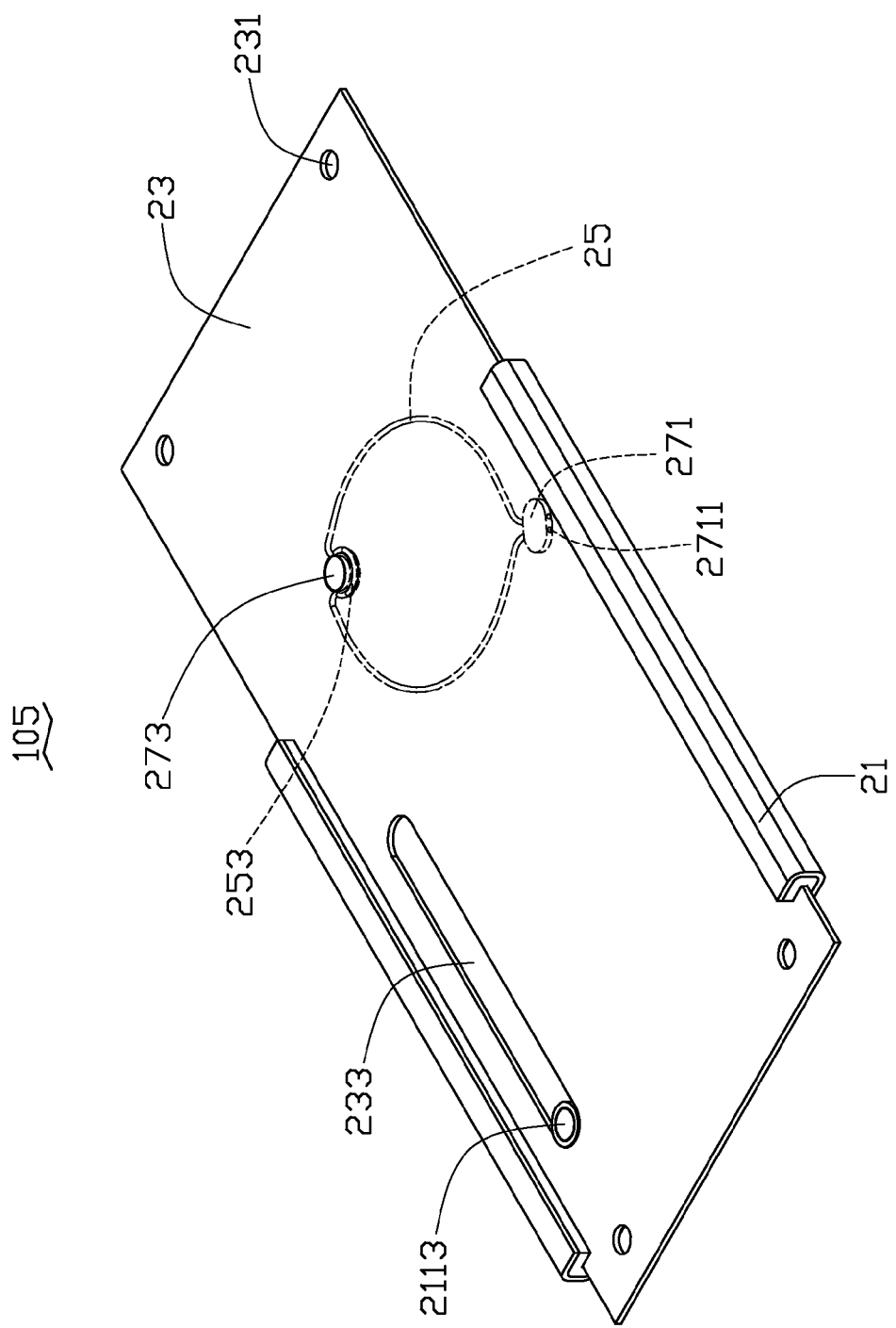
FIG. 4 is similar to FIG. 3, but in an opened position.

FIG. 3 shows the slide mechanism 105 in a closed position after assembly. The elastic member 25 remains in its natural state without any deformation. FIG. 4 shows the slide mechanism 105 in an opened position. During changing between the two positions, the first housing 101 combined with the sliding plate 23 slides lengthwise over the second housing 103 combined with the main plate 21 along the guiding groove 2131. Because the elastic member 25 is secured to the main plate 21 and the sliding plate 23 by the first mounting portion 251 and the second mounting portion 253, the elastic member 25 deforms accordingly. At this stage, the linear distance between the first mounting portion 251 and the second mounting portion 253 decreases accordingly. When the linear distance reaches a minimum amount, the direction of the linear distance is substantially perpendicular to the sliding direction of the sliding plate 23. The deformation of the elastic member 25 is maximum.

By further sliding the first housing 101, the first housing 101 automatically slides relative to the second housing 103 by the restoration of the deformed elastic member 25 until arriving at the opened position. During this stage, the linear distance between the first mounting portion 251 and the second mounting portion 253 increases and the elastic member 25 returns to its natural state.

Figure 5:
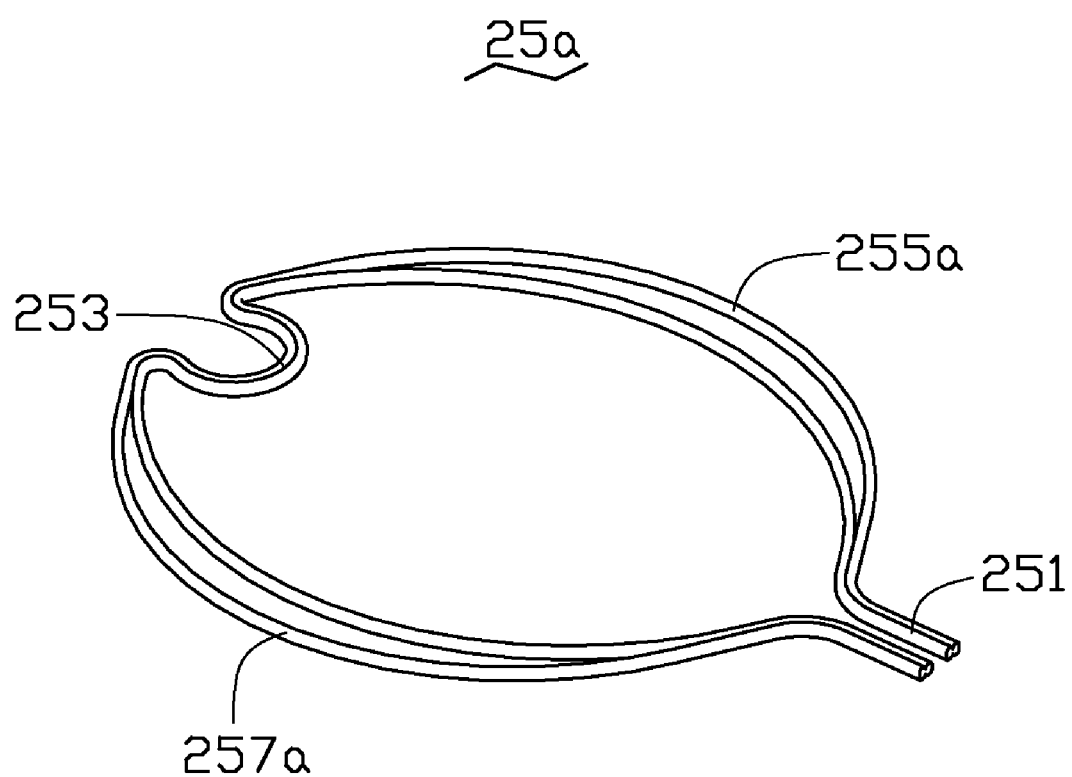
FIG. 5 is an isometric view of another exemplary elastic member.
Figure 6:
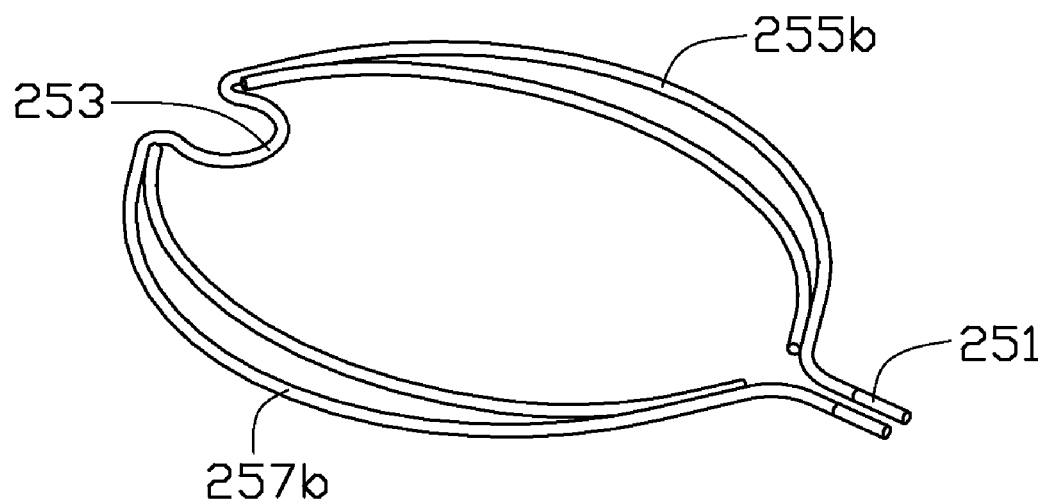
FIG. 6 is an isometric view of another exemplary elastic member.

FIGS. 5 and 6 show two variations of the elastic member 25 shown in FIGS. 1 through 4. The elastic members 25a and 25b have similar structures as the elastic member 25. Referring to FIG. 5, the elastic member 25a has two elastic members 25 integrally formed except that the two first curved portions 255a and two second curved portions 257 are separated. Referring to FIG. 6, as compared to the elastic member 25, the first curved portion 255b and the second curved portion 257b each have an additional curved portion.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A slide mechanism for a slide-type portable electronic device, comprising:
   a main plate;
   a sliding plate; and
   an elastic member including a first mounting portion, a second mounting portion, a first curved portion and a second curved portion, each of the first curved portion and the second curved portion connecting the first mounting portion and the second mounting portion, the first mounting portion secured to the main plate, the second mounting portion secured to the sliding plate, the sliding plate sliding lengthwise over the main plate by the deformation or restoration of the elastic member.

2. The slide mechanism as claimed in claim 1, wherein the slide mechanism further comprises a fixing column and a positioning column, the first mounting portion secured to the main plate by the fixing column, the second mounting portion secured to the sliding plate by the positioning column.

3. The slide mechanism as claimed in claim 2, wherein the fixing column comprises an end portion, the fixing column fixed to the main plate, the main plate defining an assembling hole, the end portion exposing through the assembling hole.

4. The slide mechanism as claimed in claim 3, wherein the end portion defines locking holes, the locking holes locking the first mounting portion therein.

5. The slide mechanism as claimed in claim 4, wherein the first mounting portion is two separated, distal end portions of the elastic member.

6. The slide mechanism as claimed in claim 2, wherein the sliding plate defines an accommodating hole, the positioning column is configured for rotatably engaging through the accommodating hole.

7. The slide mechanism as claimed in claim 6, wherein the second mounting portion securely coils around the positioning column.

8. The slide mechanism as claimed in claim 1, wherein the first mounting portion is two separated, distal end portions of the elastic member, the second mounting portion located at the middle of the elastic member and recessed inwardly towards the center of the elastic member.

9. The slide mechanism as claimed in claim 8, wherein the elastic member further comprises another first curved portion separated from the first curved portion connecting the first mounting portion and the second mounting portion, and another second curved portion separated from the second curved portion connecting the first mounting portion and the second mounting portion.

10. A slide-type portable electronic device, comprising:
    a first housing;
    a second housing slidably installed on the first housing;
    a slide mechanism, comprising:
       a main plate fixed to the first housing;
       a sliding plate fixed to the second housing; and
       an elastic member including a first mounting portion, a second mounting portion, a first curved portion and a second curved portion, each of the first curved portion and the second curved portion connecting the first mounting portion and the second mounting portion, the first mounting portion secured to the main plate, the second mounting portion secured to the sliding plate, the sliding plate sliding lengthwise over the main plate by the deformation or restoration of the elastic member.

11. The slide-type portable electronic device as claimed in claim 10, wherein the slide mechanism further comprises a fixing column and a positioning column, the first mounting portion secured to the main plate by the fixing column, the second mounting portion secured to the sliding plate by the positioning column.

12. The slide-type portable electronic device as claimed in claim 11, wherein the fixing column comprises an end portion, the fixing column fixed to the main plate, the main plate defining an assembling hole, the end portion exposing through the assembling hole.

13. The slide-type portable electronic device as claimed in claim 12, wherein the end portion defines locking holes, the locking holes locking the first mounting portion therein.

14. The slide-type portable electronic device as claimed in claim 13, wherein the first mounting portion is two separated, distal end portions of the elastic member.

15. The slide-type portable electronic device as claimed in claim 11, wherein the sliding plate defines an accommodating hole, the positioning column is configured for rotatably engaging through the accommodating hole.

16. The slide-type portable electronic device as claimed in claim 15, wherein the second mounting portion securely coils around the positioning column.

17. The slide-type portable electronic device as claimed in claim 10, wherein the first mounting portion is two separated, distal end portions of the elastic member, the second mounting portion located at the middle of the elastic member and recessed inwardly towards the center of the elastic member.

* * * * *